July 19, 1966     F. A. FLANNERY     3,261,236
CUTTING TOOL AND METHOD OF CUTTING
Filed March 8, 1965
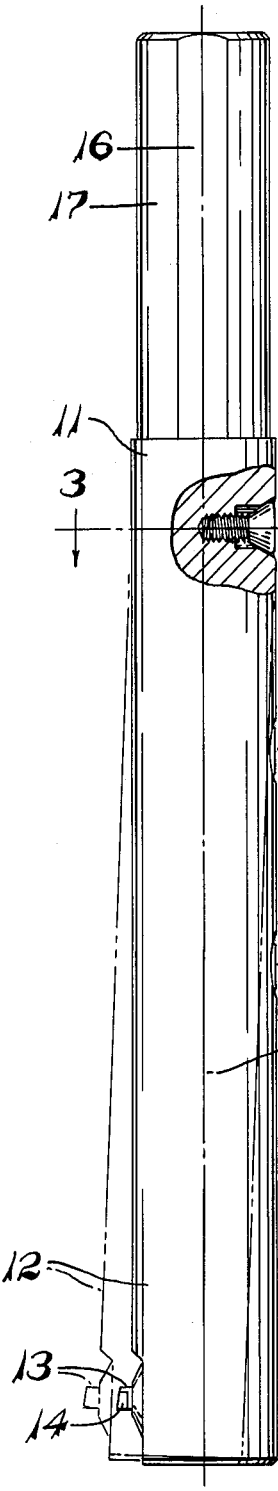
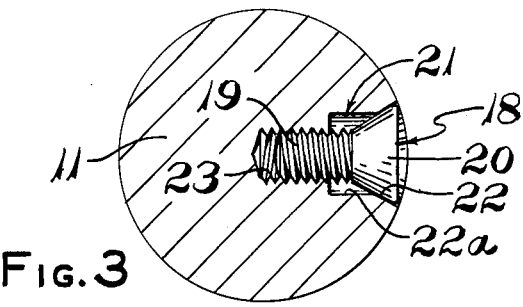
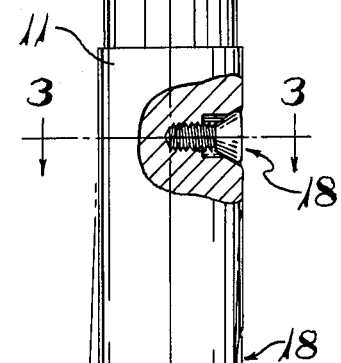
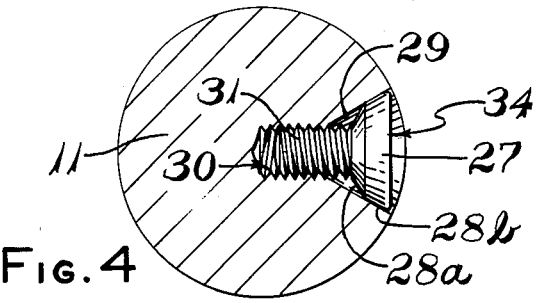
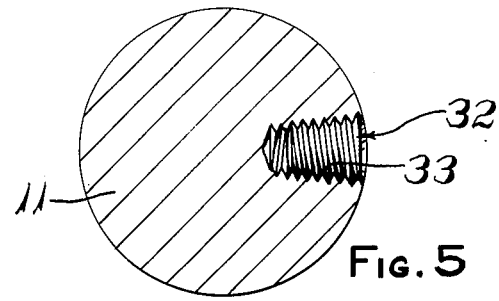
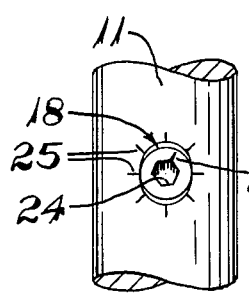
INVENTOR.
FRANK A. FLANNERY
BY
*James R. Lindsay*
ATTY.

United States Patent Office 3,261,236
Patented July 19, 1966

3,261,236
CUTTING TOOL AND METHOD OF CUTTING
Frank A. Flannery, 1875 Brookshire Road, Akron, Ohio
Filed Mar. 8, 1965, Ser. No. 437,862
10 Claims. (Cl. 77—58)

This invention relates to a machine tool and pertains more particularly to a cutting tool that includes a cutting element associated with a supporting member such as a boring bar and that is provided with means for effecting accurate and extremely fine adjustments of the cutting tool in order to produce borings of micrometric precision.

In metal boring operations, provision normally is made for transverse movement of the cutting element (relative to the boring bar) to allow for a degree of variation in the size of boring which the cutting tool is capable of producing. Various arrangements have been proposed for effecting such transverse adjustment of the cutting element, such as those described in U.S. Patents Nos. 2,524,-374; 2,537,517; 2,913,935 and 3,073,186, which have met with varying degrees of success. While certain of the devices for making such transverse adjustment have allowed the cutting tool to be set to within about 0.0001 inch, for certain precision applications a boring to a finer tolerance is required.

The present invention provides a cutting tool which can be adjusted accurately to at least within 0.00005 inch whereby borings of extreme micrometric precision readily can be accomplished. In accordance with this invention, a boring bar (or similar supporting member) is provided in its distal end with a cutting element (which can be associated with the boring bar by any one of the various known methods, such as that shown in U.S. Patent No. 3,073,186), and, in addition, is provided with tapered means inserted in an opening in the boring bar to produce a wedging force that micrometrically deflects the distal portion of the boring bar transversely of the normal longitudinal axis of the boring bar. The deflection of the distal end of the boring bar causes the cutting element housed therein to move transversely of the normal longitudinal axis of the boring bar thereby changing the dimension of the cut which would result from use of the tool. The degree of deflection can be controlled to within extremely fine tolerances allowing a cut of exacting precision to be made.

The invention will be more fully understood from the following description of several embodiments of this invention and from the drawing in which:

FIG. 1 is a view in front elevation, partly broken away and in section, of a boring bar provided with a cutting element and embodying an embodiment of this invention, and showing in phantom lines the distal portion of the boring bar deflected from its normal longitudinal position;

FIG. 2 is a fragmentary side elevation view of the boring bar of FIG. 1;

FIG. 3 is an enlarged section on the line 3—3 of FIG. 1;

FIG. 4 is a section similar to FIG. 3 showing a second embodiment of the invention; and FIG. 5 is a section similar to FIG. 3 showing a third embodiment of the invention.

Referring to FIG. 1, the cutting tool 10 comprises a boring bar 11 which is provided in its distal end 12 with a cutting element 13 that projects radially beyond the exterior surface of the boring bar 11. The cutting element 13 may be of any conventional design and may be associated and housed within the boring bar 11 by any conventional manner, although the design and manner of association described in U.S. Patent No. 3,073,186 is preferred. The cutting element 13 is provided with a cutting tip 14 normally made of tungsten carbide, although a number of other materials are offered commercially for this purpose and may be used. The cutting element 13 usually is housed within the boring bar 11 in such a manner that the cutting element 13 is adjustable transversely with respect to the longitudinal axis 15 of the boring bar 11 to permit the cutting element to be moved inwardly or outwardly with respect to the boring bar 11 in order to vary the size of boring which would be made. Certain cutting tools heretofore commercially available permit the cutting element to be set to within a tolerance of about ±0.0001 inch.

The boring bar 11 is provided with one or more longitudinally disposed shallow grooves 16 in its proximal end 17 to facilitate mounting the boring bar in a milling machine or other appropriate machine useful in boring operations.

One or more elements suitable for deflecting the distal end 12 of the boring bar 11 transversely with respect to its normal longitudinal position are located between the cutting element 13 mounted in the distal end 12 of the boring bar and the proximal end 17 of the boring bar 11. In the embodiment shown in FIG. 1, the deflecting elements 18, 18 each consists of a threaded shank 19 and a generally truncated cone-shaped head 20. The boring bar 11 is provided with openings 21, 21 which extend radially inwardly toward the center of the boring war 11 and which are adapted to receive the deflecting elements 18, 18 in the manner described hereinafter. Openings 21, 21 are comprised of a generally truncated cone-shaped orifice 22 positioned with the larger base measurement at the surface of the boring bar 11 and are provided with an offset portion 22a at the innermost reach of the orifice 22, which orifice 22 communicates with a threaded recess 23 (such as would be produced by a pipe tap) extending radially into the boring bar 11. The threads of recess 23 are complementary to the threads of the shank portion 19 of the deflecting element 18 so that the shank 19 of element 18 can be threaded conveniently into recess 23. The head 20 of the deflecting element 18 is provided with a hexagonal-shaped recess 24 suitable for receiving an Allen wrench to facilitate turning the deflecting element 18 into the opening 21, although it will be understood that instead of a hexagonal-shaped recess 24 other means for facilitating the insertion of the deflecting element 18 into the opening 21 may be used such as a groove suitable for receiving the end of a screwdriver. As shown more clearly in FIG. 3, the largest diametric dimension of the head 20 of deflecting element 18 is greater than the smallest diametric dimension of the orifice 22 of opening 21 whereby when a deflecting element 18 is turned into an opening 21 of the boring bar 11 the sloping sides of the head 20 will contact the sloping sides of orifice 22 of opening 21. As the deflecting element 18 is turned tighter into opening 21 after the sloping sides of head 20 of element 18 contact the sloping sides of orifice 22, a wedging force is developed which, since the proximal end 17 of the boring bar 11 is held rigidly in the receiver of the milling machine or other appropriate turning device, causes the distal end 12 of the boring bar 11 to be deflected away from the normal longitudinal axis 15 of the boring bar 11 (as is indicated in phantom in FIG. 1) thereby causing a deflection of the cutting element 13 which results in a change in the size of the boring which occurs from use of the tool. The openings 21, 21 are positioned on the opposite side of the boring bar 11 from the cutting tip 14 of the cutting element 13, preferably 180° out of phase, so that the deflection will occur in at least the general direction in which the cutting element 13 projects from the boring bar 11. It will be understood that the tighter the deflecting element 18 is turned into an opening 21, the greater will be the transverse deflection of the distal end of the boring bar 11 and the greater will be the size of the boring which will result. The depth of recess 23 of opening 21, of course, will need to be sufficient so that the shank portion 19 of the deflecting element 18 does not bottom in recess 23 before a desired degree of deflection of the distal end 12 of the boring bar is accomplished and the depth of the orifice 22 of opening 21 also will need to be sufficient so that the head 20 of the deflecting element 18 will not bottom in orifice 22 before a desired degree of deflection of the distal end 12 of the boring bar is achieved. The offset 22a in the bottom of orifice 22 of opening 21 allows the deflecting element 18 to be turned into boring bar 11 to a greater depth before bottoming than would be possible if the offset were not present.

It will be understood, further, that the farther the opening 21 is from the distal end of the boring bar, the greater will be the degree of deflection of the distal end of the boring bar per increment of rotation of the deflecting element 18 within opening 21. As is indicated in FIG. 1, the boring bar 11 may be provided with several deflecting elements 18, 18 spaced at intervals along the length of the boring bar 11, the deflecting elements 18, 18 closer to the distal end 12 of the boring bar 11 being capable of providing finer adjustments in the size of boring to be formed per increment of rotation of the deflecting element 18 within an opening 21 than those farther removed from the distal end 12 of the boring bar 11. While the degree of deflection has been shown in FIG. 1 to be substantial, it will be appreciated that with tool steels from which boring bars normally are fabricated the maximum deflection which will be realized will be only a few thousandths of an inch.

Preferably, the surface of the boring bar 11 adjacent an opening 21 is provided with graduated markings 25, 25, and the exterior end face of the head 20 of element 18 is provided with a reference mark 26 so that the boring bar 11 can be calibrated to establish the degree of deflection realized by an increment of rotation of the deflecting element.

In using the boring bar 11, the boring bar is locked in position in the receiver of the milling machine or similar turning device and the cutting element 13 is adjusted as accurately as possible to the setting desired (usually to within a few ten-thousandths of an inch) and locked in position. The final adjustment then is accomplished by tightening one (or more) of the deflecting elements 18 to cause the distal end of the boring bar to deflect as explained above. A boring bar similar to that shown in FIG. 1 with a deflecting element and cutting element located 8 inches apart (center to center) was capable of being adjusted to a tolerance of ±0.000001 inch. It was observed, also, that when the deflecting element was loosened, the boring bar returned to its undeflected position.

FIG. 4 illustrates a second embodiment of this invention. In this embodiment, the deflecting element 34 is similar to the deflecting element 18, except with respect to the shape of the head 27 of element 34. With reference to head 27 of element 34, it will be noticed that the sides of the head 27 are formed by two intersecting tapered surfaces 28a and 28b, the slope of surface 28b having essentially the same slope as the slope of the sides of the orifice 29 of opening 30 provided in the boring bar and into which deflecting element 34 is intended to be inserted. The slope of surface 28a is greater than that of surface 28b (with respect to the longitudinal axis of the deflecting element 34). This configuration permits the deflecting element 34 to have a longer threaded shank 31, as compared to the embodiment shown in FIG. 3, without increasing the overall length of the deflecting element.

In the embodiment of this invention shown in FIG. 5, the deflecting element 32 is a generally truncated cone-shaped plug that is threaded for insertion into a complementary threaded generally truncated cone-shaped opening 33 which extends radially inwardly into the boring bar. It will be understood that as the tapered element 32 is tightened into opening 33 beyond a snug fit a wedging force will be created that will cause the deflection of the distal end of the boring bar in the same manner as described above in connection with the embodiment shown in FIGS. 1 and 3. The depth of the opening 33 is greater than the length of the deflecting element 32 so that the deflecting element 32 does not bottom in opening 33 before the distal end of the boring bar is deflected the desired degree.

Although the invention has been described with reference to three specific embodiments, it will be understood that the invention is not intended to be limited to these constructions. It will be realized that the desired deflection of the distal end of the boring bar is accomplished by inserting a tapered plug small-end first into an opening (in the boring bar) of sufficient depth and of sufficiently small cross-sectional dimensions that as the tapered plug is forced further into the opening after obtaining a snug fit, a wedging force is created that tends to bend the boring bar. The invention, accordingly, is intended to include any arrangement that causes the distal end of the boring bar to deflect and that employs this principle.

I claim:

1. A micrometrically adjustable cutting tool which comprises a supporting member having a cutting element mounted in its distal end, said cutting element having a cutting edge projecting transversely beyond the exterior surface of said supporting member, said supporting member having an opening extending into said supporting member and positioned between said cutting element mounted in the distal end of the supporting member and the proximal end of the supporting member, said opening being positioned on the opposite side of the supporting member from the cutting tip of said cutting element, and tapered means inserted small-end first into said opening, the maximum width of said tapered means being greater than the minimum width of said opening whereby as the tapered means is forced into said opening beyond a snug fit position a wedging force is created that tends to bend the supporting member and that causes the distal end of the supporting member to deflect transversely of the normal longitudinal axis of the supporting member when the proximal end of the supporting member is rigidly fixed, said opening being of sufficient depth to allow said tapered means to be forced into said opening to a sufficient depth before bottoming in said opening to effect a desired degree of deflection of the distal end of the supporting member.

2. A micrometrically adjustable cutting tool which comprises a supporting bar having a cutting element adjustably mounted in its distal end for movement transversely of the longitudinal axis of the supporting bar, said cutting element having a cutting edge projecting transversely beyond the exterior surface of said supporting bar, said supporting bar having an opening extending into said supporting bar and positioned between said cutting element mounted in the distal end of the supporting bar and the proximal end of the supporting bar, said opening being positioned on the opposite side of the supporting bar from the cutting tip of said cutting element, and tapered means inserted small-end first into said opening, the maximum width of said tapered means being greater than the minimum width of said opening whereby as the tapered means is forced into said opening beyond a snug fit position a wedging force is created that tends to bend the supporting bar and that causes the distal end of the supporting bar to deflect transversely of the normal longitudinal axis of the supporting bar when the proximal end of the supporting bar is rigidly fixed, said opening being of sufficient depth to allow said tapered means to be forced into said opening to a sufficient depth before bottoming in said opening to effect a desired degree of deflection of the distal end of the supporting bar.

3. A micrometrically adjustable cutting tool which comprises a supporting bar having a cutting element adjustably mounted in its distal end for movement transversely of the longitudinal axis of the supporting bar, said cutting element having a cutting edge projecting transversely beyond the exterior surface of said supporting bar, said supporting bar having an opening extending radially into said supporting bar and positioned between said cutting element mounted in the distal end of the supporting bar and the proximal end of the supporting bar, said opening being positioned on the opposite side of the supporting bar from the cutting tip of said cutting element, and tapered means inserted small-end first into said opening, the maximum width of said tapered means being greater than the minimum width of said opening whereby as the tapered means is forced into said opening beyond a snug fit position a wedging force is created that tends to bend the supporting bar and that causes the distal end of the supporting bar to deflect transversely of the normal longitudinal axis of the supporting bar when the proximal end of the supporting bar is rigidly fixed, said opening being of sufficient depth to allow said tapered means to be forced into said opening to a sufficient depth before bottoming in said opening to effect a desired degree of deflection of the distal end of the supporting bar.

4. A micrometrically adjustable cutting tool which comprises a boring bar having a cutting element adjustably mounted in its distal end for movement transversely of the longitudinal axis of the boring bar, said cutting element having a cutting edge projecting transversely beyond the exterior surface of said boring bar, said boring bar having an opening extending into said boring bar and positioned between said cutting element mounted in the distal end of the boring bar and the proximal end of the boring bar, said opening being positioned on the opposite side of the boring bar from the cutting tip of said cutting element, and tapered means inserted small-end first into said opening, the maximum width of said tapered means being greater than the minimum width of said opening whereby as the tapered means is forced into said opening beyond a snug fit position a wedging force is created that tends to bend the boring bar and that causes the distal end of the boring bar to deflect transversely of the normal longitudinal axis of the boring bar when the proximal end of the boring bar is rigidly fixed, said tapered means being provided with a threaded zone extending circumferentially around said tapered means, said opening being provided with a threaded zone which is of greater length than the threaded zone of the tapered means and whose threads are complementary to the threads of the threaded zone of the tapered means so that said tapered means can be turned into said opening by a screwing action, said opening being of sufficient depth to allow said tapered means to be forced into said opening to a sufficient depth before bottoming in said opening to effect a desired degree of deflection of the distal end of the boring bar.

5. A micrometrically adjustable cutting tool which comprises a boring bar having a cutting element adjustably mounted in its distal end for movement transversely of the longitudinal axis of the boring bar, said cutting element having a cutting edge projecting transversely beyond the exterior surface of said boring bar, said boring bar having a threaded generally truncated cone-shaped opening extending radially into said boring bar with its larger base measurement at the surface of the boring bar and positioned between said cutting element mounted in the distal end of the boring bar and the proximal end of the boring bar, said opening being positioned on the opposite side of the boring bar from the cutting tip of said cutting element, and a generally truncated cone-shaped deflecting element inserted small-end first into said opening, said deflecting element being provided with threads encircling its side face which threads are complementary to the threads of the said opening, the maximum diametric dimension of said deflecting element being greater than the minimum diametric dimension of said opening whereby as the deflecting element is turned into said opening beyond a snug fit position a wedging force is created that tends to bend the boring bar and that causes the distal end of the boring bar to deflect transversely of the normal longitudinal axis of the boring bar when the proximal end of the boring bar is rigidly fixed, said opening being of sufficient depth to allow said deflecting element to be forced into said opening to a sufficient depth before bottoming in said opening to effect a desired degree of deflection of the distal end of the boring bar.

6. A micrometrically adjustable cutting tool which comprises a boring bar having a cutting element adjustably mounted in its distal end for movement transversely of the longitudinal axis of the boring bar, said cutting element having a cutting edge projecting transversely beyond the exterior surface of said boring bar, said boring bar having an opening extending radially into said boring bar and positioned between said cutting element mounted in the distal end of the boring bar and the proximal end of the boring bar, said opening being positioned on the opposite side of the boring bar from the cutting tip of said cutting element and being comprised of a generally truncated cone-shaped orifice with its larger base measurement at the surface of the boring bar which orifice communicates with a threaded recess that extends radially into the boring bar, and a deflecting element inserted into said opening, said deflecting element being comprised of a generally truncated cone-shaped head and a threaded shank depended from said head, said deflecting element being inserted shank-end first into said opening, the threads on the shank of the deflecting element being complementary to the threads of the said threaded recess of the said opening in the boring bar, the maximum diametric dimension of the head of said deflecting element being greater than the minimum diametric dimension of said orifice of said opening in the boring bar whereby as the deflecting element is turned into said opening beyond a snug fit position a wedging force is created that tends to bend the boring bar and that causes the distal end of the boring bar to deflect transversely of the normal longitudinal axis of the boring bar when the proximal end of the boring bar is rigidly fixed, the orifice of said opening and the threaded recess of said opening both being of sufficient depth to allow said deflecting element to be forced into said opening to a sufficient depth to effect a desired degree of deflection of the distal end of the boring bar before the head of the deflecting element bottoms in the orifice of the opening and before the shank of the deflecting element bottoms in the threaded recess of the opening.

7. A micrometrically adjustable cutting tool which comprises a boring bar having a cutting element adjustably mounted in its distal end for movement transversely of the longitudinal axis of the boring bar, said cutting element having a cutting edge projecting transversely beyond the exterior surface of said boring bar, said boring bar having an opening extending radially into said boring bar and positioned between said cutting element mounted in the distal end of the boring bar and the proximal end of the boring bar, said opening being positioned on the opposite side of the boring bar from the cutting tip of said cutting element and being comprised of a generally truncated cone-shaped orifice with its larger base measurement at the surface of the boring bar and with an offset at its innermost reach which orifice communicates with a threaded recess that extends radially into the boring bar, and a deflecting element inserted into said opening, said deflecting element being comprised of a generally truncated cone-shaped head and a threaded shank depended from said head, said deflecting element being inserted shank-end first into said opening, the threads on the shank of the deflecting element being complementary to the threads of the said threaded recess of the said opening in the boring bar, the maximum diametric dimension of the head of said deflecting element being greater than the minimum diametric dimension of said orifice of said opening in the boring bar whereby as the deflecting element is turned into said opening beyond a snug fit position a wedging force is created that tends to bend the boring bar and that causes the distal end of the boring bar to deflect transversely of the normal longitudinal axis of the boring bar when the proximal end of the boring bar is rigidly fixed, the orifice of said opening and the threaded recess of said opening both being of sufficient depth to allow said deflecting element to be forced into said opening to a sufficient depth to effect a desired degree of deflection of the distal end of the boring bar before the head of the deflecting element bottoms in the orifice of the opening and before the shank of the deflecting element bottoms in the threaded recess of the opening.

8. A micrometrically adjustable cutting tool which comprises a boring bar having a cutting element adjustably mounted in its distal end for movement transversely of the longitudinal axis of the boring bar, said cutting element having a cutting edge projecting transversely beyond the exterior surface of said boring bar, said boring bar having an opening extending radially into said boring bar and positioned between said cutting element mounted in the distal end of the boring bar and the proximal end of the boring bar, said opening being positioned on the opposite side of the boring bar from the cutting tip of said cutting element and being comprised of a generally truncated cone-shaped orifice with its larger base measurement at the surface of the boring bar which orifice communicates with a threaded recess that extends radially into the boring bar, and a deflecting element inserted into said opening, said deflecting element being comprised of a head portion and a threaded shank depended from said head portion, the side faces of said head portion of said deflecting element being formed by two intersecting tapered surfaces which extend circumferentially around the head portion, the slope of the said tapered surface of the head portion of the deflecting element which is farther removed from the threaded shank of the deflecting element being essentially the same as the slope of the said generally turncated cone-shaped orifice of the said opening in the boring bar and of lesser magnitude with respect to the longitudinal axis of the deflecting element than the slope of the other said tapered surface of the head portion of the deflecting element, said deflecting element being inserted shank-end first into said opening, the threads on the shank of the deflecting element being complementary to the threads of the said threaded recess of the said opening in the boring bar, the maximum diametric dimension of the head portion of said deflecting element being greater than the minimum diametric dimension of said orifice of said opening in the boring bar whereby as the deflecting element is turned into said opening beyond a snug fit position a wedging force is created that tends to bend the boring bar and that causes the distal end of the boring bar to deflect transversely of the normal longitudinal axis of the boring bar when the proximal end of the boring bar is rigidly fixed, the orifice of said opening and the threaded recess of said opening both being of sufficient depth to allow said deflecting element to be forced into said opening to a sufficient depth to effect a desired degree of deflection of the distal end of the boring bar before the head portion of the deflecting element bottoms in the orifice of the opening and before the shank of the deflecting element bottoms in the threaded recess of the opening.

9. A micrometrically adjustable cutting tool which comprises a boring bar having a cutting element adjustably mounted in its distal end for movement transversely of the longitudinal axis of the boring bar, said cutting element having a cutting edge projecting transversely beyond the exterior surface of said boring bar, said boring bar having an opening extending into said boring bar and positioned between said cutting element mounted in the distal end of the boring bar and the proximal end of the boring bar, said opening being positioned on the opposite side of the boring bar from the cutting tip of said cutting element, and tapered means inserted small-end first into said opening, the maximum width of said tapered means being greater than the minimum width of said opening whereby as the tapered means is forced into said opening beyond a snug fit position a wedging force is created that tends to bend the boring bar and that causes the distal end of the boring bar to deflect transversely of the normal longitudinal axis of the boring bar when the proximal end of the boring bar is rigidly fixed, said tapered means being provided with a threaded zone extending circumferentially around said tapered means, said opening being provided with a threaded zone which is of greater length than the threaded zone of the tapered means and whose threads are complementary to the threads of the threaded zone of the tapered means so that said tapered means can be turned into said opening by a screwing action, said opening being of sufficient depth to allow said tapered means to be forced into said opening to a sufficient depth before bottoming in said opening to effect a desired degree of deflection of the distal end of the boring bar, the surface of the boring bar adjacent the said opening being provided with graduated markings positioned at intervals about said opening and the exterior end face of said tapered means being provided with a reference mark whereby the boring bar can be calibrated to establish the degree of deflection of the distal end of the boring bar realized by an increment of rotation of the deflecting element in the said opening.

10. The method for micrometrically deflecting the distal end of a boring bar having a cutting element projecting tranversely from the exterior surface thereof which comprises forcing a tapered deflecting element into an opening extending into said boring bar and located between the cutting element mounted in the distal end of the boring bar and the proximal end of the boring bar and on the opposite side of the boring bar from the cutting edge of the cutting element and having a minimal diametric measurement less than the maximal diametric measurement of said tapered deflecting element to a position beyond a snug fit position whereby a wedging force is created that causes the distal end of the boring bar to deflect transversely when the proximal end of the boring bar is rigidly fixed.

No references cited.

WILLIAM W. DYER, Jr., *Primary Examiner.*

G. A. DOST, *Assistant Examiner.*